United States Patent Office 3,165,419
Patented Jan. 12, 1965

3,165,419
NEW IRON-TUNGSTEN OXIDE COMPOSITION
Gerhard Bayer, Hinteregg-Zurich, Switzerland, assignor to Owens-Illinois Glass Company, a corporation of Ohio
No Drawing. Filed Nov. 15, 1960, Ser. No. 69,284
3 Claims. (Cl. 106—299)

This invention relates to a new iron-tungsten oxide compound, $Fe_2WO_6$, and to methods for its preparation. In another aspect the invention relates to solid solutions of this compound.

It is an object of this invention to provide a new metal oxide of iron and tungsten wherein the tungsten is present in the hexavalent form.

It is another object of this invention to provide methods for the preparation of this new compound.

A still further object of the invention is to provide a new iron-tungsten metal oxide which has a novel inverse columbite structure.

Another object of the invention is to provide solid solutions of the new iron-tungsten oxide, $Fe_2WO_6$.

Other objects and aspects of the invention will become apparent from a consideration of the accompanying disclosure.

Several synthetic crystalline compounds are known which have a columbite-type structure. Columbite represents a family of minerals with a similar structure $(Fe, Mn)(Ta, Nb)_2O_6$. Synthetic columbite-type compounds which are known include $FeNB_2O_6$ and $ZnTa_2O_6$. All of these compounds are of the type $A^{2+}B_2^{5+}O_6$.

According to the present invention, I have now found a new columbite-type compound of the formula $$Fe_2WO_6$$

Thus, the B ion is hexavalent and the positions of the A and B ions in the lattice are therefore interchanged. The structure can thus be interpreted as an "inverse" columbite structure. Thus, this is an entirely new type of crystalline compound.

According to the invention, the new compound is prepared by intimately admixing $Fe_2O_3$ and $WO_3$, compacting the powdered mixture into a cohesive mass, and thereafter heat-treating the material, preferably in a nonreducing atmosphere at a temperature above about 750° C. The upper limit of preparation should be held to about 950° C., and in any event, below the temperature at which an undesirably high rate of decomposition of $Fe_2WO_6$ occurs. Thus, the compound is decomposed almost completely to $Fe_2O_3$ after firing for 100 hours at 1100° C. A practical upper limit is usually around 950–1000° C. In actual practice an oxidizing atmosphere is usually employed, such as air. Times of preparation can be from 2 to 30 hours, usually from 5 to 20 hours, although shorter or longer times than these ranges can be used. If too short a time is used, the yield is merely lowered; too long a time is merely unnecessary.

In preparing the compound, it is desirable that equimolar ratios of $Fe_2O_3$ and $WO_3$ be employed in order to obtain a product substantially free from contamination of one or the other of the starting materials. However, ratios above or below the ideal ratios can be used, it being understood that the purity will be lowered. In preparing the compound, the powdered starting materials are desirably 30 microns or finer.

In a series of specific examples of the invention, equimolar portions of $Fe_2O_3$ and $WO_3$, each in finely divided powdered form passing through a 20-mesh screen, were fired at temperatures of 600, 700, 760, 850, 900 and 950° C. for 20 hours. The sample at 760° C. showed by X-ray powder diffraction data that the reaction had begun but was not complete, while the lower temperature samples did not indicate any substantial reaction. Therefore, for temperatures of 750 or 760° C. it will be apparent that a longer time is required for complete reaction. The samples above this temperature showed substantially complete reaction in the X-ray powder diffraction data since neither of the starting materials was detected by the X-ray technique.

In Table I, the X-ray powder diffraction data are shown:

TABLE I

X-ray Powder Diffraction Data

| d | I/I₁ | hkl |
|---|---|---|
| 4.43 | 12 | x |
| 4.30 | 16 | x |
| 4.19 | 7 | x |
| 3.56 | 48 | 111 |
| 3.30 | 7 | x |
| 2.88 | 100 | 131 |
| 2.785 | 12 | 002 |
| 2.70 | 8 | x |
| 2.485 | 18 | 200 |
| 2.43 | 23 | 102 |
| 2.38 | 4 | x |
| 2.29 | 13 | 060 |
|  |  | 122 |
| 2.15 | 8 | 132 |
| 2.036 | 11 | 231 |
| 1.96 | 3 | x |
| 1.86 | 7 | 202 |
| 1.83 | 4 | x |
| 1.78 | 5 | 222 |
| 1.72 | 15 | 033 |
| 1.69 | 18 | 260 |
| 1.67 | 22 | 162 |
| 1.50 | 11 | 331 |
| 1.425 | 7 | 302 |
| 1.415 | 13 | 233 |
| 1.35 | 8 | 332 |

$x$ = superstructure reflections.

The compound had an orthorhombic unit cell, space group $P_{can}$, $Z = 4$.

The $x$ values in the third column are superstructure reflections which first were apparent in samples prepared at 850° C. and were strongly present in the samples prepared at 950° C. The superstructure reflections were not present in the sample prepared at 760° C. Table II shows the lattice constants for the primitive or disordered unit cell, ignoring the superstructure formation.

TABLE II

Lattice Constants (A.U.)

$a_0$ ---------------------------------------- 4.97
$b_0$ ---------------------------------------- 13.75
$c_0$ ---------------------------------------- 5.57

The density of the compound calculated from the X-ray data was 6.66 grams per cubic centimeter, while the experimental density determined by pycnometer techniques was 6.43 grams per cubic centimeter. The color of the compound was a rich dark brown.

By compressing $Fe_2WO_6$ and rutile ($TiO_2$) mixtures, powdered to below 20 microns, into coherent form and firing these at 700° C. for 20 hours, a series of solid solutions having a rutile structure were formed. The lattice constants were $a_0 = 4.64$ A.U.; $c_0 = 2.98$ A.U. for the solid solution formed between three mols of rutile and 1 mol of $Fe_2WO_6$. Thus, the unit cell of rutile is slightly increased. The solid solution of 1 mol of $Fe_2WO_6$ and 2 mols of $TiO_2$ was similarly formed and had very slightly larger lattice constants. Thus, I have also found that my new compound can form a solid solution with $TiO_2$ (rutile) wherein the $Fe_2WO_6$ is about one-third or less of the solid solution. These solid solutions appear black.

Similarly, solid solutions of $Fe_2WO_6$ were formed in $Cr_2WO_6$. These solid solutions have an inverse trirutile structure and were prepared by mixing the pure oxides in finely divided form in the desired molar ratios, pressing and firing at 960° C. for 20 hours. After quenching to room temperature, the samples were investigated by X-rays. Thus, it was found that the inverse trirutile ($Cr_2WO_6$) could take up to 3 mols of $Fe_2WO_6$ into solid solution having the inverse trirutile structure. These had slightly larger lattice constants than the $Cr_2WO_6$ compound in pure form. The lattice constants of $Cr_2WO_6$ are $a_0=4.57$ Angstrom units and $c_0=8.86$ Angstrom units. The color of these solid solutions was violet-brown. The preparation and properties of $Cr_2WO_6$ are set forth in copending application S.N. 52,778, filed August 30, 1960, now U.S. Patent 3,070,422. This compound can be prepared by mixing powders of $Cr_2O_3$ and $WO_3$ in equimolar ratios, compacting and firing at 1000° C. for 20 hours.

The new compound and solid solutions of this invention are useful particularly as ceramic coloring agents in enamels, glazes, and paints and as fillers and coloring agents in plastics such as polyethylene and polystyrene. In the plastics, they can be employed in amounts of 0.5% to 10% or even more, being milled with the plastics in finely divided form.

The new compound can be used, for instance, in the following paint formula.

| Ingredient: | Lbs. |
|---|---|
| $Fe_2WO_6$ | 300 |
| Zinc oxide | 25 |
| Long-oil soya alkyd resin (60% nonvolatile) | 480 |
| Mineral spirits | 181 |
| Cobalt naphthenate (6% Co) | 3 |
| Lead naphthenate (24% Pb) | 3 |
| Calcium naphthenate (4% Ca) | 2 |
| Total | 994 |

Either of the solid solutions of the invention can be substituted in the above paint formula.

As will be evident to those skilled in the art, various modifications of this invention can be made or followed in the light of the foregoing disclosure and discussion without departing from the spirit and scope of the disclosure or from the scope of the claims.

I claim:

1. The compound $Fe_2WO_6$ in solid solution in rutile in an amount up to one-third mol fraction of the solid solution, said solid solution having a rutile type crystalline structure.

2. The compound $Fe_2WO_6$ in solid solution in $Cr_2WO_6$ in an amount up to 3 mols of said compound to 1 mol of $Cr_2WO_6$, said solid solution having a rutile-type crystalline structure.

3. The compound $Fe_2WO_6$ in solid solution in rutile, in an amount between about 1 mol of $Fe_2WO_6$ to 3 mols of rutile and about 1 mol of $Fe_2WO_6$ to 2 mols of rutile, said solid solution having a rutile type crystalline structure.

References Cited in the file of this patent

UNITED STATES PATENTS

| 2,473,703 | Colton et al. | June 21, 1949 |
| 2,576,456 | Harvey et al. | Nov. 27, 1951 |
| 2,766,133 | Marcot et al. | Oct. 9, 1956 |
| 2,818,347 | Brickenkamp et al. | Dec. 31, 1957 |
| 2,962,349 | Anglin | Nov. 29, 1960 |
| 3,022,186 | Hund | Feb. 20, 1962 |

FOREIGN PATENTS

| 384,473 | Great Britain | Dec. 8, 1932 |

OTHER REFERENCES

Kozmonov: Zhur. Fiz. Khim., volume 31, pages 1861–1865 (1957) [Chemical Abstracts, volume 52, 6038i].

Kozmonov: Fiz. Metal. i Metallved., volume 5, pages 74–81 (1957) [Chemical Abstracts, volume 52, 8006b].

Mellor: Comprehensive Treatise on Inorganic and Theoretical Chemistry, Longmans, Green and Co., New York, vol. XI, pages 678 and 801 (1931).